United States Patent
Chu (10) Patent No.: US 10,789,026 B2
(45) Date of Patent: Sep. 29, 2020

(54) PRINTING CONTROL METHOD AND DEVICE

(71) Applicant: BEIJING XIAOMI MOBILE SOFTWARE CO., LTD., Beijing (CN)

(72) Inventor: Yueyue Chu, Beijing (CN)

(73) Assignee: BEIJING XIAOMI MOBILE SOFTWARE CO., LTD., Beijing (CN)

( * ) Notice: Subject to any disclaimer, the term of this patent is extended or adjusted under 35 U.S.C. 154(b) by 0 days.

(21) Appl. No.: 16/024,166

(22) Filed: Jun. 29, 2018

(65) Prior Publication Data

US 2019/0004753 A1    Jan. 3, 2019

(30) Foreign Application Priority Data

Jun. 30, 2017    (CN) .......................... 2017 1 0521364

(51) Int. Cl.
*G06F 3/12*    (2006.01)
*H04W 4/02*    (2018.01)
*H04W 12/06*    (2009.01)

(52) U.S. Cl.
CPC .......... *G06F 3/1239* (2013.01); *G06F 3/1204* (2013.01); *G06F 3/1213* (2013.01);
(Continued)

(58) Field of Classification Search
CPC .... G06F 3/1239; G06F 3/1292; G06F 3/1285; G06F 3/1267; G06F 3/1238;
(Continued)

(56) References Cited

U.S. PATENT DOCUMENTS 7,936,872 B2 *    5/2011    Krumm ................... H04L 29/06
                                               370/913
8,009,311 B2 *    8/2011    Takahashi ............. G06F 21/608
                                               358/1.13

(Continued)

FOREIGN PATENT DOCUMENTS

CN    101095142 A    12/2007
CN    103698789 A    4/2014
(Continued)

OTHER PUBLICATIONS

Extended European Search Report dated Sep. 10, 2018 in European Patent Application No. 18180171.3, 7 pages.

(Continued)

*Primary Examiner* — Tammy Paige Goddard
*Assistant Examiner* — Darryl V Dottin
(74) *Attorney, Agent, or Firm* — Oblon, McClelland, Maier & Neustadt, L.L.P.

(57) ABSTRACT

The present disclosure relates to a printing control method and device. The method includes receiving a printing request configured to request a printer to execute a printing task, wherein the printing request comprises first identity verification information and the printing task associated with the first identity verification information; when a first mobile equipment is detected, determining second identity verification information of the first mobile equipment; determining whether the first identity verification information matches the second identity verification information; determining whether a state of the first mobile equipment meets a first preset condition, wherein the state of the first mobile equipment comprises at least one of (i) a distance between the first mobile equipment and the printer, and (ii) a strength of a wireless signal from the first mobile equipment; and when the first identity verification information matches the second identity verification information and the state of the (Continued)

first mobile equipment meets the first preset condition, controlling the printer to execute the printing task.

14 Claims, 6 Drawing Sheets

(52) U.S. Cl.
CPC .......... G06F 3/1222 (2013.01); G06F 3/1238 (2013.01); G06F 3/1267 (2013.01); G06F 3/1285 (2013.01); G06F 3/1292 (2013.01); H04W 4/023 (2013.01); H04W 12/06 (2013.01)

(58) Field of Classification Search
CPC .... G06F 3/1213; G06F 3/1204; G06F 3/1222; H04W 12/06; H04W 4/023
USPC .......................................... 359/1.15; 358/1.15
See application file for complete search history.

(56) References Cited

U.S. PATENT DOCUMENTS 9,207,884 B1 * 12/2015 Baratharajan ......... G06F 3/1204
2008/0007767 A1 * 1/2008 Ishimaru ................. G06F 21/35
358/1.15
2013/0072229 A1 3/2013 Schnurr
2013/0085968 A1 * 4/2013 Schultz ................... G06F 21/32
705/400

FOREIGN PATENT DOCUMENTS

| | | |
|---|---|---|
| CN | 105426134 A | 3/2016 |
| CN | 106126137 A | 11/2016 |
| JP | 2003-341190 A | 12/2003 |
| KR | 10-2006-0023483 | 3/2006 |

OTHER PUBLICATIONS

Chinese Office Action dated Aug. 12, 2019 in Chinese Application No. 201710521364.8, 12 pages.
Second Chinese Office Action, with English translation, dated May 9, 2020 in counterpart Chinese Application No. 201710521364.8, (14 pages).

* cited by examiner

PRINTING CONTROL METHOD AND DEVICE

CROSS-REFERENCE TO RELATED APPLICATIONS

This application is filed based upon and claims priority to Chinese Patent Application No. 201710521364.8, filed on Jun. 30, 2017, the entire contents of which are incorporated herein by reference.

TECHNICAL FIELD

The present disclosure generally relates to the technical field of communications, and more particularly, to a printing control method and device.

BACKGROUND

In general, a printer may directly execute a printing task upon reception of a printing task sent by a user terminal, or sequentially execute printing tasks in chronological order at which the printing tasks are received. In this case, when printing periods of multiple users overlap or some users fail to timely take away printed materials, printed materials of the multiple users may be mixed, which not only causes inconvenience to the users but also greatly increases the risk of exposing printed information of the users.

SUMMARY

This Summary is provided to introduce a selection of aspects of the present disclosure in a simplified form that are further described below in the Detailed Description. This Summary is not intended to identify key features or essential features of the claimed subject matter, nor is it intended to be used to limit the scope of the claimed subject matter.

Aspects of the disclosure provide a printing control method. The method includes receiving a printing request configured to request a printer to execute a printing task, wherein the printing request comprises first identity verification information and the printing task associated with the first identity verification information; when a first mobile equipment is detected, determining second identity verification information of the first mobile equipment; determining whether the first identity verification information matches the second identity verification information; determining whether a state of the first mobile equipment meets a first preset condition, wherein the state of the first mobile equipment comprises at least one of (i) a distance between the first mobile equipment and the printer, and (ii) a strength of a wireless signal from the first mobile equipment; and when the first identity verification information matches the second identity verification information and the state of the first mobile equipment meets the first preset condition, controlling the printer to execute the printing task.

In an example, the method includes determining the distance between the first mobile equipment and the printer; and when the distance between the first mobile equipment and the printer is determined to be less than a first distance threshold, determining that the state of the first mobile equipment meets the first preset condition.

In another example, the method includes determining the strength of the wireless signal from the first mobile equipment; and when the strength of the wireless signal from the first mobile equipment is greater than a first strength threshold, determining that the state of the first mobile equipment meets the first preset condition.

According to an aspect, the method further includes controlling the printer to pause execution of the printing task when at least one of (i) the state of the first mobile equipment is changed into a state that does not meet the first preset condition, and (ii) the first mobile equipment fails to be detected.

According to another aspect, when a second mobile equipment is detected and a state of the second mobile equipment meets a second preset condition, the method includes executing a prompting action, wherein the state of the second mobile equipment comprises at least one of (i) a distance between the second mobile equipment and the printer, and (ii) a strength of a wireless signal from the second mobile equipment.

In an example, the method includes determining the distance between the second mobile equipment and the printer; and when the distance between the second mobile equipment and the printer is determined to be less than a second distance threshold, determining that the state of the second mobile equipment meets the second preset condition.

In another example, the method includes determining the strength of the wireless signal from the second mobile equipment; and when the strength of the wireless signal from the second mobile equipment is greater than a second strength threshold, determining that the state of the second mobile equipment meets the second preset condition.

Aspects of the disclosure also provide a printing control device including a processor and a memory configured to store instructions executable by the processor. The processor is configured to receive a printing request configured to request a printer to execute a printing task, wherein the printing request comprises first identity verification information and the printing task associated with the first identity verification information; when a first mobile equipment is detected, determine second identity verification information of the first mobile equipment; determine whether the first identity verification information matches the second identity verification information; determine whether a state of the first mobile equipment meets a first preset condition, wherein the state of the first mobile equipment comprises at least one of (i) a distance between the first mobile equipment and the printer, and (ii) a strength of a wireless signal from the first mobile equipment; and when the first identity verification information matches the second identity verification information and the state of the first mobile equipment meets the first preset condition, control the printer to execute the printing task.

Aspects of the disclosure also provide a non-transitory computer-readable storage medium storing instructions that, when executed by a processor of a device, cause the device to receive a printing request configured to request a printer to execute a printing task, wherein the printing request comprises first identity verification information and the printing task associated with the first identity verification information; when a first mobile equipment is detected, determine second identity verification information of the first mobile equipment; determine whether the first identity verification information matches the second identity verification information; determine whether a state of the first mobile equipment meets a first preset condition, wherein the state of the first mobile equipment comprises at least one of (i) a distance between the first mobile equipment and the printer, and (ii) a strength of a wireless signal from the first mobile equipment; and when the first identity verification information matches the second identity verification information and the state of the first mobile equipment meets the first preset condition, control the printer to execute the printing task.

It is to be understood that both the foregoing general description and the following detailed description are illustrative and explanatory only and are not restrictive of the present disclosure.

BRIEF DESCRIPTION OF THE DRAWINGS

The accompanying drawings, which are incorporated in and constitute a part of this specification, illustrate aspects consistent with the present disclosure and, together with the description, serve to explain the principles of the present disclosure.

The specific aspects of the present disclosure, which have been illustrated by the accompanying drawings described above, will be described in detail below. These accompanying drawings and description are not intended to limit the scope of the present disclosure in any manner, but to explain the concept of the present disclosure to those skilled in the art via referencing specific aspects.

DETAILED DESCRIPTION

Reference will now be made in detail to exemplary aspects, examples of which are illustrated in the accompanying drawings. The following description refers to the accompanying drawings in which the same numbers in different drawings represent the same or similar elements unless otherwise represented. The implementations set forth in the following description of exemplary aspects do not represent all implementations consistent with the present disclosure. Instead, they are merely examples of apparatuses and methods consistent with aspects related to the present disclosure as recited in the appended claims.

Figure 1:
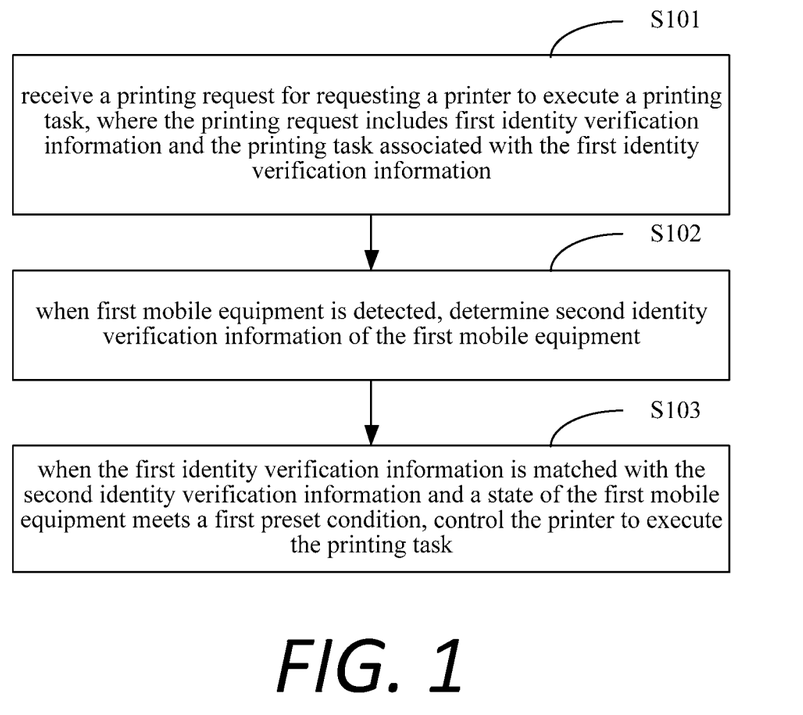
FIG. 1 is a flow chart showing a printing control method, according to an exemplary aspect of the present disclosure.

FIG. 1 is a flow chart showing a printing control method, according to an exemplary aspect. The method may be applied to a printer, may also be applied to other equipment separated from the printer, and for example, may be applied to user terminal equipment. The method may include the following steps.

In Step S101, a printing request for requesting a printer to execute the printing task is received, where the printing request includes first identity verification information and a printing task associated with the first identity verification information.

An execution performer of the aspect may receive the printing request through a wired or wireless connection.

According to an aspect, the first identity verification information may be an equipment Identifier (ID) of equipment sending the printing request. For example, when the printing request is sent by a computer, the first identity verification information may include (for example, only include) a computer name of the computer, for example, "computer of user1".

According to an aspect, the first identity verification information may include (for example, only include) an ID of an owner of a printed object (for example, a certain document). For example, when the printing request is sent by a computer, the ID of the owner may be an ID, recorded in the computer, of the owner of the printed object, for example, "user1", it is usually registration information of a user on the computer, and the ID of the owner may also be information indicating a fingerprint characteristic of the owner and the like.

Those skilled in the art may set applicable first identity verification information according to a requirement, which will not be limited in the present disclosure.

According to an aspect, the first identity verification information may be encrypted, thereby facilitating further protection over privacy of the user.

In Step S102, when a first mobile equipment is detected, second identity verification information of the first mobile equipment is determined.

The execution performer of the aspect may detect the first mobile equipment by adopting any applicable wireless communication protocol such as ZigBee, Bluetooth, Wireless-Fidelity (Wi-Fi), Ultra Wideband (UWB) and Infrared Data Association (IrDA), which will not be limited herein.

the first mobile equipment may be a wireless mobile terminal such as a smart mobile phone, a smart wristband and a tablet computer.

According to an aspect, the second identity verification information of the first mobile equipment may be determined according to an equipment ID of the first mobile equipment. For example, when an equipment name of the first mobile equipment is detected to be "wristband of user1", it may be determined that the second identity verification information is "wristband of user1".

According to an aspect, the second identity verification information of the first mobile equipment may be determined according to specific information sent by the first mobile equipment. For example, when the first mobile equipment is detected, the first mobile equipment may be requested to send a user ID, for example, the information indicating the fingerprint characteristic of the user, and the user ID is determined as the second identity verification information.

Those skilled in the art may further set/determine the second identity verification information of the first mobile equipment by adopting any other applicable technical means, which will not be limited in the present disclosure.

According to an aspect, the second identity verification information may be encrypted, thereby facilitating further protection over the privacy of the user.

In Step S103, when the first identity verification information is matched with the second identity verification information and a state of the first mobile equipment meets a first preset condition, the printer is controlled to execute the printing task, where the state of the first mobile equipment includes a distance between the first mobile equipment and the printer or a strength of a wireless signal from the first mobile equipment.

A matching relationship between the first identity verification information and the second identity verification information may be preset in the execution performer of the aspect. Such a matching relationship may be definitely specified, and may also be determined on the basis of a matching principle.

According to an aspect, each piece of second identity verification information matched with each piece of legal first identity verification information may be set in advance in the execution performer. For example, second identity verification information matched with a first identity message "computer of user1" may be set to be "wristband of user1" or "mobile phone of user1". When first identity verification information included in a certain printing request is "computer of user1", if the second identity verification information of the detected first mobile equipment is "wristband of user1" or "mobile phone of user1", it may be considered that they are matched, otherwise it is considered that they are mismatched. Such a matching relationship may be one-to-one, may be one-to-multiple, may be multiple-to-one, and may further be multiple-to-multiple, which may be set by those skilled in the art according to a requirement.

According to another aspect, the matching principle between the first identity verification information and the second identity verification information may be set in advance in the execution performer. For example, a matching rule may be that: when the first identity verification information is completely consistent with the second identity verification information, it is considered that they are matched, otherwise it is considered that they are mismatched; or, the matching rule may be that: when the first identity verification information and the second identity verification information have the same keyword, it is considered that they are matched, otherwise it is considered that they are mismatched; and the like. Those skilled in the art may set according to a requirement.

According to an aspect, the first identity verification information and the second identity verification information may be encrypted. In an example, the first identity verification information and the second identity verification information may be decrypted at first, and whether they are matched or not is determined on the basis of decrypted information. In another example, whether they are matched or not may be directly determined on the basis of the encrypted first identity verification information and the encrypted second identity verification information. Under the latter circumstance, the execution performer of the aspect is not required to acquire real first identity verification information and second identity verification information, so that security of information of the user is further improved.

According to an aspect, when the state of the first mobile equipment includes the distance between the first mobile equipment and the printer, in case of the distance between the first mobile equipment and the printer being smaller than a first distance threshold, it is determined that the state of the first mobile equipment meets the first preset condition. For example, the first distance threshold is set to be 3 meters, and when it is detected that the distance between the first mobile equipment and the printer is 2 meters, it may be determined that the state of the first mobile equipment meets the first preset condition.

According to the aspect, when identity verification succeeds, as long as it is detected that the distance between the first mobile equipment and the printer is smaller than the first distance threshold, the printer may be controlled to execute the printing task, so that both identity verification efficiency and protection over the privacy of the user may be achieved.

According to another aspect, when the state of the first mobile equipment includes the strength of the wireless signal from the first mobile equipment, in case of the strength of the wireless signal from the first mobile equipment being higher than a first strength threshold, it is determined that the state of the first mobile equipment meets the first preset condition. For example, the first strength threshold is set to be 20 Along Signal Units (ASUs), and if it is detected that the strength of the wireless signal from the first mobile equipment is 23 ASUs, it may be determined that the state of the first mobile equipment meets the first preset condition.

According to the aspect, when it is detected that the strength of the wireless signal from the first mobile equipment is higher than the first strength threshold, it may be considered that a distance between the first mobile equipment and the execution performer is within a specific range, and at this moment, as long as identity verification succeeds, the printer may be controlled to execute the printing task, so that both the identity verification efficiency and protection over the privacy of the user may be achieved.

According to an aspect, if the printer is currently in an idle state, the action of controlling the printer to execute the printing task may refer to that the printer is controlled to directly start printing for the printing task; and when the printer is currently in a working state, the action of controlling the printer to execute the printing task may refer to that the printing task is added into a waiting list of the printer and then the printer directly starts printing for the printing task after completing processing a current printing task and printing tasks arranged ahead in the waiting list. It can be understood that, in case of a circumstance change in a waiting process, for example, the state of the first mobile equipment no longer meets the first preset condition, the printer may be controlled to delete the printing task from the waiting list.

According to an aspect, the action of controlling the printer to execute the printing task may further include that prompting information is sent to user equipment (for example, the first mobile equipment) to request the user to finally confirm whether to execute the printing task or not. When the user confirms to execute the printing task, for example, as mentioned above, the printer may be controlled to directly print for the printing task, or the printer is controlled to add the printing task into the waiting list.

In the aspect shown in FIG. 1, the printer may be controlled to execute the printing task when identity verification information (i.e. the second identity verification information) of the first mobile equipment passes verification and the strength of the signal or the distance with the printer meets a specific condition, so that privacy security of printed information of the user may be ensured on one hand, and on the other hand, the situations that the user picks own printed materials from mixed printed materials may be effectively reduced, and convenience is brought to the user; and in addition, according to the present disclosure, manual contact verification of the user is not required, so that verification efficiency and convenience are improved.

According to an aspect, the method shown in FIG. 1 further includes the following actions. During execution of the printing task by the printer, when any one of the following printing pausing conditions is triggered, the printer is controlled to pause execution of the printing task, where the printing pausing conditions include that: the state of the first mobile equipment is changed into a state that does not meet the first preset condition; and the first mobile equipment fails to be detected.

According to the aspect, when the state of the first mobile equipment no longer meets the specific condition, for example, the distance between the first mobile equipment and the execution performer of the aspect is no longer smaller than the first distance threshold, or the strength of the signal from the first mobile equipment is no longer higher than the first strength threshold and a connection signal with the first mobile equipment is lost, the printer may be controlled to pause execution of the printing task, so that the circumstance that the printing task of the user is still executed when the user leaves is avoided, which is favorable for protection over the privacy of the user.

According to an aspect, the printing task paused to be executed may be marked with a printing breakpoint, and when it is detected that the state of the first mobile equipment meets the first preset condition again or the first mobile equipment is detected again, the printer is controlled to restart executing the printing task from the marked printing breakpoint.

Figure 2:
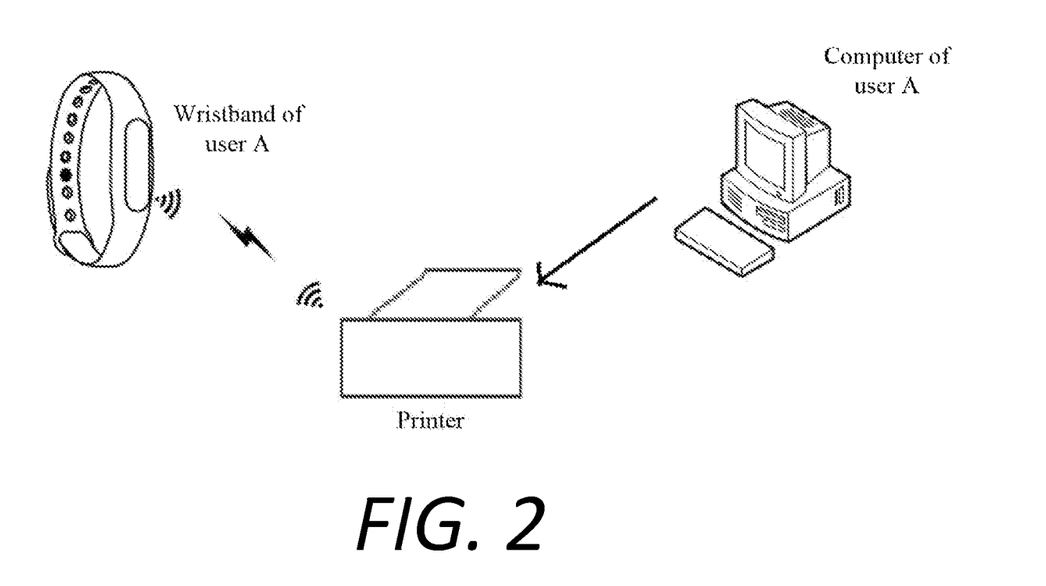
FIG. 2 is a schematic diagram illustrating an application scenario of a printing control method, according to an exemplary aspect of the present disclosure.

FIG. 2 is a schematic diagram illustrating an application scenario of a printing control method, according to an exemplary aspect. In the example, an execution performer of the method is a printer. As shown in FIG. 2, the printer receives a printing request sent by user terminal equipment through a wired communication channel, the printing request including first identity verification information and a printing task associated with the first identity verification information and the first identity verification information being an equipment ID of a user terminal, i.e. "computer of user A". It is set that second identity verification information matched with the first identity verification information "computer of user A' is preset in the printer to be "mobile phone of user A" or "wristband of user A". At a certain moment, the printer detects that an equipment name of certain mobile equipment is "wristband of user A" and a distance between it and the printer is smaller than a first distance threshold (for example, 3 meters), the printer executes the printing task associated with the first identity verification information "computer of user A".

Figure 3:
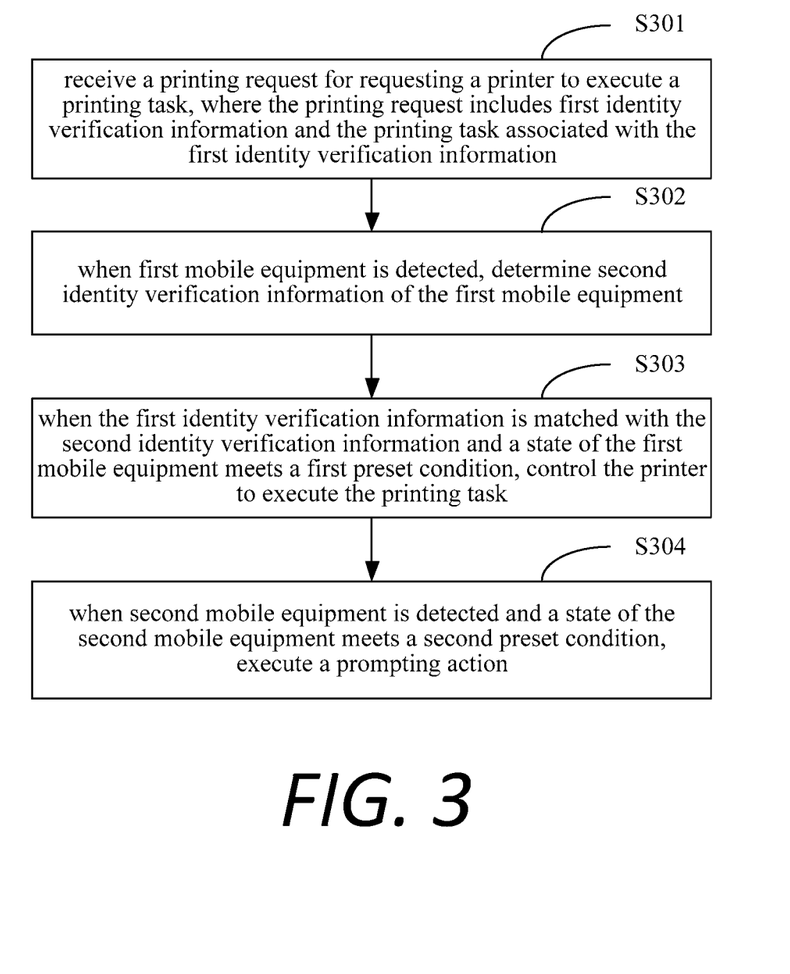
FIG. 3 is a flow chart showing a printing control method, according to an exemplary aspect of the present disclosure.

FIG. 3 is a flow chart showing a printing control method, according to an example of an exemplary aspect. As shown in FIG. 3, the method includes Step S301 to Step S304. Step S301 to Step S303 are similar to Step S101 to Step S103 shown in FIG. 1. In Step S304, when a second mobile equipment is detected and a state of the second mobile equipment meets a second preset condition, a prompting action is executed, where the state of the second mobile equipment includes a distance between the second mobile equipment and a printer or a strength of a wireless signal from the second mobile equipment.

According to an aspect, the second mobile equipment may be a wireless mobile terminal such as a smart mobile phone, a smart wristband and a tablet computer.

According to an aspect, when the state of the second mobile equipment includes the distance between the second mobile equipment and the printer, in case of the distance between the second mobile equipment and the printer being smaller than a second distance threshold, it is determined that the state of the second mobile equipment meets the second preset condition; or, when the state of the second mobile equipment includes the strength of the wireless signal from the second mobile equipment, in case of the strength of the wireless signal from the second mobile equipment being higher than a second strength threshold, it is determined that the state of the second mobile equipment meets the second preset condition.

The second distance threshold and the second strength threshold may be set according to a practical condition. For example, it may be set that the second distance threshold is the same as a first distance threshold mentioned above and the second strength threshold is the same as a first strength threshold mentioned above; and it may also be set that the second distance threshold is smaller than the first distance threshold mentioned above and the second strength threshold is higher than the first strength threshold mentioned above. In this art, settings may be made according to a practical application scenario and a requirement, which will not be limited in the present disclosure.

According to an aspect, the action of executing the prompting action may include that an execution performer of the aspect sends prompting information. For example, it is set that the execution performer of the aspect is the printer, and then the prompting information may be displayed on a display screen of the printer or a prompting sound may be produced, to prompt that there is another user getting close.

According to an aspect, the action of executing the prompting action may include that: the execution performer of the aspect may send an instruction to user equipment to enable the user equipment to send a prompting message to make such a prompt that there is another user getting close. For example, it is set that the execution performer of the aspect is the printer, the printer may send an instruction to the user equipment (for example, a first mobile equipment), and the user equipment may display prompting information or produce a prompting sound or vibrate according to the instruction to prompt that there is another user getting close.

According to the aspect, if another person is detected to get close, a user of a printing task being executed or to be executed (for example, arranged in a waiting list of the printer) may be prompted, and for example, whether to continue printing or not may be prompted. This is favorable for further protecting a privacy of the user.

Figure 4:
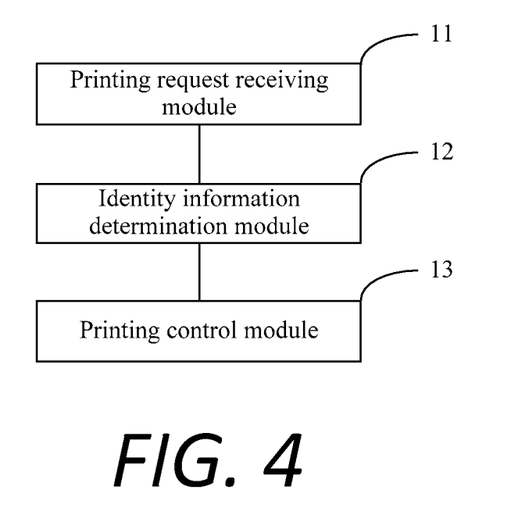
FIG. 4 is a block diagram of a printing control device, according to an exemplary aspect of the present disclosure.

FIG. 4 is a block diagram of a printing control device, according to an exemplary aspect. The device may be applied to a printer, may also be applied to other equipment separated from the printer, and for example, may be applied to user terminal equipment. Referring to FIG. 4, the device includes a printing request receiving module 11, an identity information determination module 12 and a printing control module 13. The printing request receiving module 11 is arranged to receive a printing request for requesting a printer to execute a printing task, where the printing request includes first identity verification information and a printing task associated with the first identity verification information. The identity information determination module 12 is arranged to, when a first mobile equipment is detected, determine second identity verification information of the first mobile equipment. The printing control module 13 is arranged to, when the first identity verification information is matched with the second identity verification information and a state of the first mobile equipment meets a first preset condition, control the printer to execute the printing task, where the state of the first mobile equipment includes a distance between the first mobile equipment and the printer or a strength of a wireless signal from the first mobile equipment.

Figure 5:
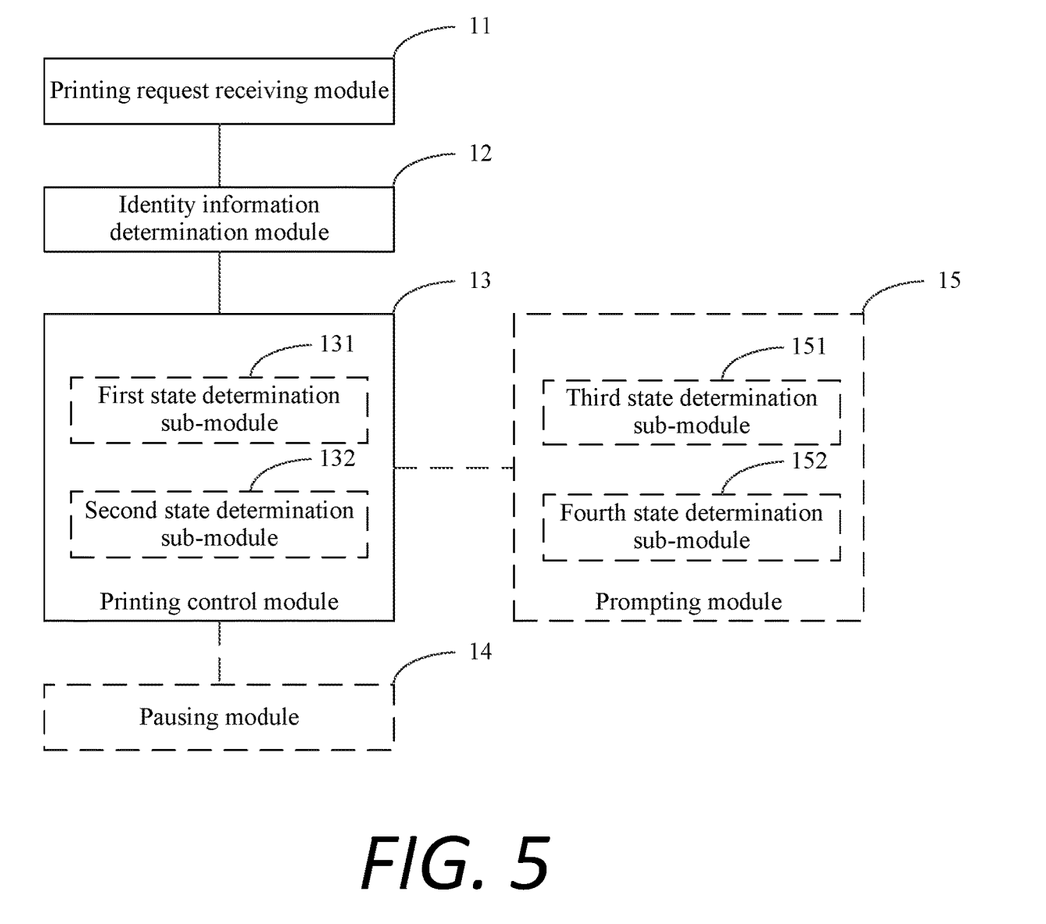
FIG. 5 is a block diagram of a printing control device, according to an example of an exemplary aspect of the present disclosure.

FIG. 5 is a block diagram of a printing control device, according to an example of an exemplary aspect.

According to an aspect, when the state of the first mobile equipment includes the distance between the first mobile equipment and the printer, the printing control module 13 includes a first state determination sub-module 131, and the first state determination sub-module 131 is arranged to, when the distance between the first mobile equipment and the printer is smaller than a first distance threshold, determine that the state of the first mobile equipment meets the first preset condition.

According to another aspect, when the state of the first mobile equipment includes the strength of the wireless signal from the first mobile equipment, the printing control module 13 includes a second state determination sub-module 132, and the second state determination sub-module 132 is arranged to, when the strength of the wireless signal from the first mobile equipment is higher than a first strength threshold, determine that the state of the first mobile equipment meets the first preset condition.

According to an aspect, the device further includes a pausing module 14, and the pausing module 14 is arranged to, during execution of the printing task by the printer, if any one of the following printing pausing conditions is triggered, control the printer to pause execution of the printing task, where the printing pausing conditions include that:

the state of the first mobile equipment is changed into a state that does not meet the first preset condition; and the first mobile equipment fails to be detected.

According to an aspect, the device further includes a prompting module 15, and the prompting module 15 is arranged to, when a second mobile equipment is detected and a state of the second mobile equipment meets a second preset condition, execute a prompting action, where the state of the second mobile equipment includes a distance between the second mobile equipment and the printer or a strength of a wireless signal from the second mobile equipment.

According to an aspect, when the state of the second mobile equipment includes the distance between the second mobile equipment and the printer, the prompting module 15 includes a third state determination sub-module 151, and the third state determination sub-module 151 is arranged to, when the distance between the second mobile equipment and the printer is smaller than a second distance threshold, determine that the state of the second mobile equipment meets the second preset condition.

According to another aspect, when the state of the second mobile equipment includes strength of a wireless signal from the second mobile equipment, the prompting module 15 includes a fourth state determination sub-module 152, and the fourth state determination sub-module 152 is arranged to, when the strength of the wireless signal from the second mobile equipment is higher than a second strength threshold, determine that the state of the second mobile equipment meets the second preset condition.

With respect to the devices in the above aspects, the specific manners for performing operations for individual modules therein have been described in detail in the aspects regarding the methods, which will not be elaborated herein.

An aspect of the present disclosure further provides a printer, which includes any abovementioned printing control device.

An aspect of the present disclosure further provides a printing control device, which includes: a processor; and a memory arranged to store an instruction executable for the processor, the processor being arranged to execute any abovementioned printing control method.

Figure 6:
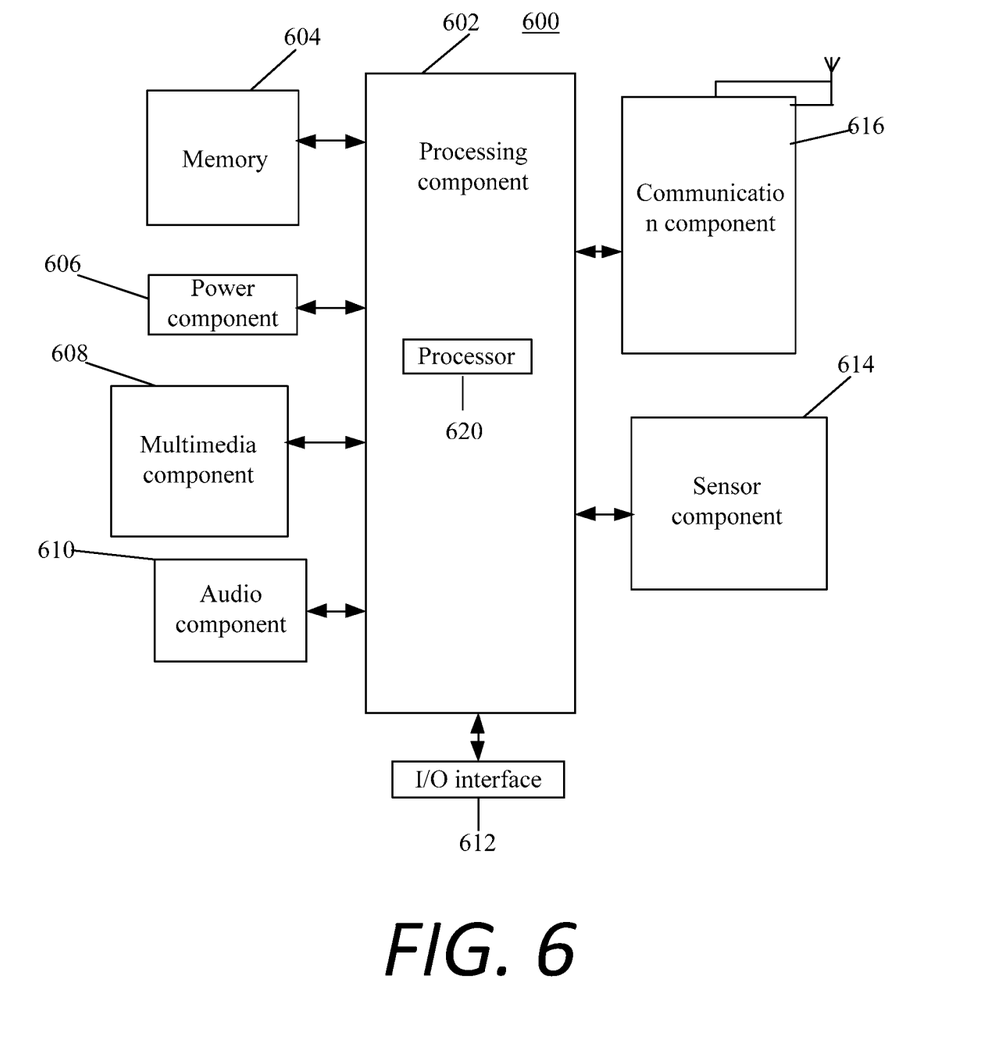
FIG. 6 is a block diagram of a printing control device 600, according to an exemplary aspect of the present disclosure.

FIG. 6 is a block diagram of a printing control device 600, according to an exemplary aspect. For example, the device 600 may be a mobile phone, a smart wristband, a smart watch, smart glasses, a computer, a digital broadcast terminal, a messaging device, a gaming console, a tablet, a medical device, exercise equipment, a personal digital assistant, and the like.

Referring to FIG. 6, the device 600 may include one or more of the following components: a processing component 602, a memory 604, a power component 606, a multimedia component 608, an audio component 610, an Input/Output (I/O) interface 612, a sensor component 614, and a communication component 616.

The processing component 602 typically controls overall operations of the device 600, such as the operations associated with display, telephone calls, data communications, camera operations, and recording operations. The processing component 602 may include one or more processors 620 to execute instructions to perform all or part of the steps in the abovementioned method. Moreover, the processing component 602 may include one or more modules which facilitate interaction between the processing component 602 and the other components. For instance, the processing component 602 may include a multimedia module to facilitate interaction between the multimedia component 608 and the processing component 602.

The memory 604 is arranged to store various types of data to support the operation of the device 600. Examples of such data include instructions for any application programs or methods operated on the device 600, contact data, phonebook data, messages, pictures, video, etc. The memory 604 may be implemented by any type of volatile or non-volatile memory devices, or a combination thereof, such as a Static Random Access Memory (SRAM), an Electrically Erasable Programmable Read-Only Memory (EEPROM), an Erasable Programmable Read-Only Memory (EPROM), a Programmable Read-Only Memory (PROM), a Read-Only Memory (ROM), a magnetic memory, a flash memory, and a magnetic or optical disk.

The power component 606 provides power for various components of the device 600. The power component 606 may include a power management system, one or more power supplies, and other components associated with the generation, management and distribution of power for the device 600.

The multimedia component 608 includes a screen providing an output interface between the device 600 and a user. In some aspects, the screen may include a Liquid Crystal Display (LCD) and a Touch Panel (TP). If the screen includes the TP, the screen may be implemented as a touch screen to receive an input signal from the user. The TP includes one or more touch sensors to sense touches, swipes and gestures on the TP. The touch sensors may not only sense a boundary of a touch or swipe action, but also detect a duration and pressure associated with the touch or swipe action. In some aspects, the multimedia component 608 includes a front camera and/or a rear camera. The front camera and/or the rear camera may receive external multimedia data when the device 600 is in an operation mode, such as a photographing mode or a video mode. Each of the front camera and the rear camera may be a fixed optical lens system or have focusing and optical zooming capabilities.

The audio component 610 is arranged to output and/or input an audio signal. For example, the audio component 610 includes a Microphone (MIC), and the MIC is arranged to receive an external audio signal when the device 600 is in the operation mode, such as a call mode, a recording mode and a voice recognition mode. The received audio signal may be further stored in the memory 604 or sent through the communication component 616. In some aspects, the audio component 610 further includes a speaker arranged to output the audio signal.

The I/O interface 612 provides an interface between the processing component 602 and a peripheral interface module, and the peripheral interface module may be a keyboard, a click wheel, a button and the like. The button may include, but not limited to: a home button, a volume button, a starting button and a locking button.

The sensor component 614 includes one or more sensors arranged to provide status assessment in various aspects for the device 600. For instance, the sensor component 614 may detect an on/off status of the device 600 and relative positioning of components, such as a display and small keyboard of the device 600, and the sensor component 614 may further detect a change in a position of the device 600 or a component of the device 600, presence or absence of contact between the user and the device 600, orientation or acceleration/deceleration of the device 600 and a change in temperature of the device 600. The sensor component 614 may include a proximity sensor arranged to detect presence of an object nearby without any physical contact. The sensor component 614 may also include a light sensor, such as a Complementary Metal Oxide Semiconductor (CMOS) or Charge Coupled Device (CCD) image sensor, configured for use in an imaging application. In some aspects, the sensor component 614 may also include an acceleration sensor, a gyroscope sensor, a magnetic sensor, a pressure sensor or a temperature sensor.

The communication component 616 is arranged to facilitate wired or wireless communication between the device 600 and other equipment. The device 600 may access a communication-standard-based wireless network, such as a WiFi network, a 2nd-Generation (2G) or 3rd-Generation (3G) network or a combination thereof. In an exemplary aspect, the communication component 616 receives a broadcast signal or broadcast associated information from an external broadcast management system through a broadcast channel. In an exemplary aspect, the communication component 616 further includes a Near Field Communication (NFC) module to facilitate short-range communication. For example, the NFC module may be implemented on the basis of a Radio Frequency Identification (RFID) technology, an IrDA technology, a UWB technology, a BT technology and another technology.

In an exemplary aspect, the device 600 may be implemented by one or more Application Specific Integrated Circuits (ASICs), Digital Signal Processors (DSPs), Digital Signal Processing Devices (DSPDs), Programmable Logic Devices (PLDs), Field Programmable Gate Arrays (FPGAs), controllers, micro-controllers, microprocessors or other electronic components, and is arranged to execute the abovementioned method.

In an exemplary aspect, there is also provided a non-transitory computer-readable storage medium including an instruction, such as the memory 604 including an instruction, and the instruction may be executed by the processor 620 of the device 600 to implement the abovementioned method. For example, the non-transitory computer-readable storage medium may be a ROM, a Random Access Memory (RAM), a Compact Disc Read-Only Memory (CD-ROM), a magnetic tape, a floppy disc, optical data storage equipment and the like.

The present disclosure may be a system, a method and/or a computer program product. The computer program product may include a computer-readable storage medium, on which a computer-readable program instruction arranged to enable a processor to implement each aspect of the present disclosure is carried.

The computer-readable storage medium may be physical equipment capable of keeping and storing an instruction used by instruction execution equipment. The computer-readable storage medium may be, for example, but not limited to, electric storage equipment, magnetic storage equipment, optical storage equipment, electromagnetic storage equipment, semiconductor storage equipment or any proper combination thereof. A more specific example (non-exhaustive list) of the computer-readable storage medium includes: a portable computer disk, a hard disk, a RAM, a ROM, an EPROM (or flash memory), an SRAM, a portable CD-ROM, a Digital Video Disk (DVD), a memory stick, mechanical coding equipment, a punched card or in-slot bump structure with, for example, an instruction stored thereon, and any proper combination thereof. The computer-readable storage medium used here is not explained as an instantaneous signal, such as a radio wave or another freely propagated electromagnetic wave, an electromagnetic wave propagated through a waveguide or another transmission medium (for example, an optical pulse passing through an optical fiber cable), or an electric signal transmitted through an electric wire.

The computer-readable program instruction described here may be downloaded from the computer-readable storage medium to each piece of computing/processing equipment or downloaded to an external computer or external storage equipment through a network, for example, the Internet, a Local Area Network (LAN), a Wide Area Network (WAN) and/or a wireless network. The network may include a copper transmission cable, optical fiber transmission, wireless transmission, a router, a firewall, a switch, a gateway computer and/or an edge server. A network adaptation card of network interface in each piece of computing/processing equipment receives the computer-readable program instruction from the network, and forwards the computer-readable program instruction for storage in the computer-readable storage medium in each piece of computing/processing equipment.

The computer program instruction arranged to execute operations of the present disclosure may be an assembly instruction, an Instruction Set Architecture (ISA) instruction, a machine instruction, a machine related instruction, a microcode, a firmware instruction, state setting data or a source code or target code compiled by virtue of one or any combination of multiple programming languages, and the programming languages include an object-oriented programming language such as Smalltalk and C++, and a conventional procedural programming language such as "C" language or a similar programming language. The computer-readable program instruction may be completely executed on a user computer, partially executed on the user computer, executed as an independent software package, executed partially on the user computer and partially on a remote computer or completely executed on the remote computer or a server. Under circumstances involving the remote computer, the remote computer may be connected to the user computer through any type of network, including a LAN or a WAWN, or, may be connected to an external computer (for example, connected by virtue of an Internet service provider through the Internet). In some aspects, an electronic circuit, for example, a programmable logic circuit, an FPGA or a Programmable Logic Array (PLA), is customized by virtue of state information of the computer-readable program instruction, and the electronic circuit may execute the computer-readable program instruction, thereby implementing each aspect of the present disclosure.

Each aspect of the present disclosure is described here with reference to flow charts and/or block diagrams of the method, device (system) and computer program product according to the aspects of the present disclosure. It should be understood that each block in the flow charts and/or the block diagrams and combinations of each block in the flow charts and/or the block diagrams may be implemented by computer-readable program instructions.

These computer-readable program instructions may be provided for a universal computer, a dedicated computer or a processor of another programmable data processing device to generate a machine, so that a device for realizing a function/action specified in one or more blocks in the flow charts and/or the block diagrams is generated when these instructions are executed through the computer or the processor of the other programmable data processing device. These computer-readable program instructions may also be stored in a computer-readable memory, and these instructions guide the computer, the programmable data processing device and/or other equipment to work in a specific manner, so that the computer-readable medium including the instructions includes a product including instructions implementing each aspect of the function/action specified in the one or more blocks in the flow charts and/or the block diagrams.

These computer-readable program instructions may further be loaded onto the compute, the other programmable data processing device or the other equipment, so that a series of operating steps are executed on the computer, the other programmable data processing device or the other equipment to generate a process implemented by the computer, and the instructions executed on the computer, the other programmable data processing device or the other equipment implement the function/action specified in the one or more blocks in the flow charts and/or the block diagrams.

The flow charts and block diagrams in the accompanying drawings show system architectures, functions and operations, which may be implemented, of the system, method and computer program product according to multiple aspects of the present disclosure. In this regard, each block in the flow charts or the block diagrams may represent a part of a module, a program segment or an instruction, and a part of the module, the program segment or the instruction includes one or more executable instructions arranged to realize specified logic functions. In some alternative implementations, functions marked in the blocks may also be realized in sequences different from those marked in the accompanying drawings. For example, two continuous blocks may actually be executed substantially in parallel, they may also be executed according to an opposite sequence sometimes, and this depends on an involved function. It is also important to note that each block in the block diagrams and/or the flow charts and the combinations of the blocks in the block diagrams and/or the flow charts may be implemented by virtue of hardware-based systems dedicated to the specified functions or actions, or may be implemented by combinations of dedicated hardware and computer instructions.

It is noted that the various modules, sub-modules, units, and components in the present disclosure can be implemented using any suitable technology. For example, a module may be implemented using circuitry, such as an integrated circuit (IC). As another example, a module may be implemented as a processing circuit executing software instructions.

Other aspects of the disclosure will be apparent to those skilled in the art from consideration of the specification and practice of the disclosure disclosed here. This application is intended to cover any variations, uses, or adaptations of the disclosure following the general principles thereof and including such departures from the present disclosure as come within known or customary practice in the art. It is intended that the specification and examples be considered as illustrative only, with a true scope and spirit of the disclosure being indicated by the following claims.

It will be appreciated that the present disclosure is not limited to the exact construction that has been described above and illustrated in the accompanying drawings, and that various modifications and changes can be made without departing from the scope thereof. It is intended that the scope of the disclosure only be limited by the appended claims.

What is claimed is:

1. A printing control method, comprising:
    receiving a printing request configured to request a printer to execute a printing task, wherein the printing request comprises first identity verification information and the printing task associated with the first identity verification information;
    when a first mobile equipment is detected, determining second identity verification information of the first mobile equipment;
    determining whether the first identity verification information matches the second identity verification information;
    determining whether a state of the first mobile equipment meets a first preset condition, wherein the state of the first mobile equipment comprises at least one of (i) a distance between the first mobile equipment and the printer, and (ii) a strength of a wireless signal from the first mobile equipment;
    when the first identity verification information matches the second identity verification information and the state of the first mobile equipment meets the first preset condition, controlling the printer to execute the printing task;
    when a second mobile equipment is detected and a state of the second mobile equipment meets a second preset condition, executing a prompting action to prompt the first mobile equipment that the second mobile equipment is nearby, wherein the state of the second mobile equipment comprises at least one of (i) a distance between the second mobile equipment and the printer, and (ii) a strength of a wireless signal from the second mobile equipment; and
    controlling the printer to pause execution of the printing task when at least one of (i) the state of the first mobile equipment is changed into a state that does not meet the first preset condition, and (ii) the first mobile equipment fails to be detected.

2. The method of claim 1, further comprising: determining the distance between the first mobile equipment and the printer; and
    when the distance between the first mobile equipment and the printer is determined to be less than a first distance threshold, determining that the state of the first mobile equipment meets the first preset condition.

3. The method of claim 1, further comprising:
    determining the strength of the wireless signal from the first mobile equipment; and
    when the strength of the wireless signal from the first mobile equipment is greater than a first strength threshold, determining that the state of the first mobile equipment meets the first preset condition.

4. The method of claim 1, further comprising:
    determining the distance between the second mobile equipment and the printer; and
    when the distance between the second mobile equipment and the printer is determined to be less than a second distance threshold, determining that the state of the second mobile equipment meets the second preset condition.

5. The method of claim 1, further comprising:
    determining the strength of the wireless signal from the second mobile equipment; and when the strength of the wireless signal from the second mobile equipment is greater than a second strength threshold, determining that the state of the second mobile equipment meets the second preset condition.

6. A printing control device, comprising:
a processor; and
a memory configured to store instructions executable by the processor,
wherein the processor is configured to:
receive a printing request configured to request a printer to execute a printing task, wherein the printing request comprises first identity verification information and the printing task associated with the first identity verification information;
when a first mobile equipment is detected, determine second identity verification information of the first mobile equipment;
determine whether the first identity verification information matches the second identity verification information;
determine whether a state of the first mobile equipment meets a first preset condition, wherein the state of the first mobile equipment comprises at least one of (i) a distance between the first mobile equipment and the printer, and (ii) a strength of a wireless signal from the first mobile equipment;
when the first identity verification information matches the second identity verification information and the state of the first mobile equipment meets the first preset condition, control the printer to execute the printing task;
when a second mobile equipment is detected and a state of the second mobile equipment meets a second preset condition, execute a prompting action to prompt the first mobile equipment that the second mobile equipment is nearby, wherein the state of the second mobile equipment comprises at least one of (i) a distance between the second mobile equipment and the printer, and (ii) a strength of a wireless signal from the second mobile equipment; and
control the printer to pause execution of the printing task when at least one of (i) the state of the first mobile equipment is changed into a state that does not meet the first preset condition, and (ii) the first mobile equipment fails to be detected.

7. The device of claim 6, wherein the processor is further configured to:
determine the distance between the first mobile equipment and the printer; and
when the distance between the first mobile equipment and the printer is determined to be less than a first distance threshold, determine that the state of the first mobile equipment meets the first preset condition.

8. The device of claim 6, wherein the processor is further configured to:
determine the strength of the wireless signal from the first mobile equipment; and
when the strength of the wireless signal from the first mobile equipment is greater than a first strength threshold, determine that the state of the first mobile equipment meets the first preset condition.

9. The device of claim 6, wherein the processor is further configured to:
determine the distance between the second mobile equipment and the printer; and
when the distance between the second mobile equipment and the printer is determined to be less than a second distance threshold, determine that the state of the second mobile equipment meets the second preset condition.

10. The device of claim 6, wherein the processor is further configured to:
determine the strength of the wireless signal from the second mobile equipment; and
when the strength of the wireless signal from the second mobile equipment is greater than a second strength threshold, determine that the state of the second mobile equipment meets the second preset condition.

11. A non-transitory computer-readable storage medium storing instructions that, when executed by a processor of a device, cause the device to:
receive a printing request configured to request a printer to execute a printing task, wherein the printing request comprises first identity verification information and the printing task associated with the first identity verification information;
when a first mobile equipment is detected, determine second identity verification information of the first mobile equipment;
determine whether the first identity verification information matches the second identity verification information;
determine whether a state of the first mobile equipment meets a first preset condition, wherein the state of the first mobile equipment comprises at least one of (i) a distance between the first mobile equipment and the printer, and (ii) a strength of a wireless signal from the first mobile equipment;
when the first identity verification information matches the second identity verification information and the state of the first mobile equipment meets the first preset condition, control the printer to execute the printing task;
when a second mobile equipment is detected and a state of the second mobile equipment meets a second preset condition, execute a prompting action to prompt the first mobile equipment that the second mobile equipment is nearby, wherein the state of the second mobile equipment comprises at least one of (i) a distance between the second mobile equipment and the printer, and (ii) a strength of a wireless signal from the second mobile equipment; and
control the printer to pause execution of the printing task when at least one of (i) the state of the first mobile equipment is changed into a state that does not meet the first preset condition, and (ii) the first mobile equipment fails to be detected.

12. The non-transitory computer-readable storage medium of claim 11, wherein the instructions farther cause the device to:
determine the distance between the first mobile equipment and the printer; and
when the distance between the first mobile equipment and the printer is determined to be less than a first distance threshold, determine that the state of the first mobile equipment meets the first preset condition.

13. The non-transitory computer-readable storage medium of claim 11, wherein the instructions further cause the device to:
determine the strength of the wireless signal from the first mobile equipment; and
when the strength of the wireless signal from the first mobile equipment is greater than a first strength threshold, determine that the state of the first mobile equipment meets the first preset condition.

14. The non-transitory computer-readable storage medium of claim 11, wherein the instructions further cause the device to:
  determine the distance between the second mobile equipment and the printer; and
  when the distance between the second mobile equipment and the printer is determined to be less than a second distance threshold, determine that the state of the second mobile equipment meets the second preset condition.

* * * * *